(12) United States Patent
Shimazawa et al.

(10) Patent No.: US 8,018,685 B2
(45) Date of Patent: Sep. 13, 2011

(54) HEAD GIMBAL ASSEMBLY FOR HEAT-ASSISTED MAGNETIC RECORDING

(75) Inventors: Koji Shimazawa, Tokyo (JP); Ryuta Murakoshi, Hong Kong (CN)

(73) Assignees: TDK Corporation, Tokyo (JP); SAE Magnetics (H.K.) Ltd., Hong Kong (CN)

( * ) Notice: Subject to any disclaimer, the term of this patent is extended or adjusted under 35 U.S.C. 154(b) by 560 days.

(21) Appl. No.: 12/252,963

(22) Filed: Oct. 16, 2008

(65) Prior Publication Data

US 2010/0097724 A1   Apr. 22, 2010

(51) Int. Cl.
- G11B 21/16 (2006.01)
- G11B 5/48 (2006.01)
- G11B 5/127 (2006.01)

(52) U.S. Cl. ................. 360/245.3; 360/125.31
(58) Field of Classification Search ............... 360/245.3
See application file for complete search history.

(56) References Cited

U.S. PATENT DOCUMENTS

| | | |
|---|---|---|
| 2004/0081031 A1 | 4/2004 | Saga et al. |
| 2006/0187564 A1 | 8/2006 | Sato et al. |
| 2008/0043360 A1* | 2/2008 | Shimazawa et al. ............ 360/59 |
| 2010/0073804 A1* | 3/2010 | Ikeda et al. ..................... 360/59 |
| 2010/0073817 A1* | 3/2010 | Takayama et al. ............ 360/128 |
| 2010/0085846 A1* | 4/2010 | Shimazawa et al. ........ 369/13.14 |

FOREIGN PATENT DOCUMENTS

JP   A-2006-054474   2/2006

OTHER PUBLICATIONS

Black et al., "Thermal Management in Heat-Assisted Magnetic Recording," *IEEE Transactions on Magnetics*, Jan. 2007, vol. 43, No. 1, pp. 62-66.
McDaniel et al., "Issues in Heat-Assisted Perpendicular Recording," *IEEE Transactions on Magnetics*, Jul. 2003, vol. 39, No. 4, pp. 1972-1979.

* cited by examiner

Primary Examiner — Hoai Ho
Assistant Examiner — Min Huang
(74) Attorney, Agent, or Firm — Oliff & Berridge, PLC (57) ABSTRACT

Provided is an HGA with a radiation structure that can effectively get away the heat generated from a light source. The HGA comprises a suspension and a head comprising a slider and a light source unit. The suspension comprises an opening, and the light source unit projects through the opening to the opposite side to the slider in relation to the suspension. Further, the first and second pads are provided on the upper and lower surfaces of the suspension, respectively, the end surface opposite to the source-installation surface of the light source is connected to the first pad by the first connection member, and an electrode of the head part is connected to the second pad by the second connection member. Thus, heat flow paths can be provided from the light source to the opposed-to-medium surface to allow effective radiation of the heat generated from the light source.

10 Claims, 7 Drawing Sheets

HEAD GIMBAL ASSEMBLY FOR HEAT-ASSISTED MAGNETIC RECORDING

BACKGROUND OF THE INVENTION

1. Field of the Invention

The present invention relates to a head gimbal assembly provided with a magnetic head for writing data signals according to heat-assisted magnetic recording technique, and to a magnetic recording apparatus provided with the head gimbal assembly.

2. Description of the Related Art

As the recording density of a magnetic recording apparatus, such as a magnetic disk apparatus, becomes higher, further improvement has been required in the performance of a thin-film magnetic head and a magnetic recording medium. As the thin-film magnetic head, a composite-type thin-film magnetic head is widely used, which has a stacked structure of a magnetoresistive (MR) element for reading data and an electromagnetic transducer for writing data.

On the other hand, the magnetic recording medium is generally a kind of discontinuous body of magnetic microparticles gathered together. Here, one record bit consists of a plurality of the magnetic microparticles. Therefore, in order to improve the recording density, it is necessary to decrease the size of the magnetic microparticles and reduce irregularity in the boundary of the record bit. However, the decrease in size of the magnetic microparticles raises a problem of degradation of thermal stability of magnetization due to decrease in volume.

As a method of solving this problem of thermal stability, so-called a heat-assisted magnetic recording technique is proposed, in which writing is performed by reducing the anisotropic magnetic field with heat supplied to the magnetic recording medium formed of magnetic material with large $K_U$ just before application of the write field. For the heat-assisted magnetic recording technique, for example, US Patent Publication No. 2004/081031 A1 discloses a near-field light probe that generates near-field light for heating by receiving light from a light source, which is formed in contact with the main magnetic pole of a write head for perpendicular magnetic recording in such a way that the irradiated surface of the near-field light probe is perpendicular to the medium surface.

Other various modes of the heat-assisted magnetic recording technique are suggested, however, the present inventors propose a heat-assisted magnetic recording head constituted by joining a light source unit including a light source to the end surface (back surface) opposite to the opposed-to-medium surface of a slider including a write head element. For example, US Patent Publication No. 2008/043360 A1 discloses such a light source unit. The advantages of the above-described heat-assisted magnetic recording head are as follows:

a) The head has an affinity with the conventional manufacturing method of thin-film magnetic heads because the opposed-to-medium surface and the element-integration surface are perpendicular to each other in the slider.

b) The light source can avoid suffering mechanical shock directly during operation because the light source is provided far from the opposed-to-medium surface.

c) The light source such as a laser diode and the head elements can be evaluated independently of each other; thus the degradation of manufacturing yield for obtaining the whole head can be avoided. Whereas, in the case that all the light source and head elements are provided within the slider, the manufacturing yield rate for obtaining the whole head is likely to decrease significantly due to the multiplication of the process yield for the light-source and the process yield for the head elements.

d) The head can be manufactured with reduced man-hour and at low cost, because of no need to provide the head with optical components such as a lens or prism which are required to have much high accuracy, or optical elements having a special structure for connecting optical fibers or the like.

The above-described heat-assisted magnetic recording head is combined with a suspension to construct a head gimbal assembly (HGA). The HGA is a main component for properly reading and writing data from and onto a rotating magnetic recording medium in a magnetic recording apparatus. As an HGA for heat-assisted magnetic recording, for example, US Patent Publication No. 2006/0187564 A1 discloses one embodiment in which a heat-assisted magnetic recording head is attached to a suspension. Moreover, Japanese Patent Publication No. 2006-54474A discloses a multilayer structure having polyimide resin layers for a suspension.

A problem to be solved in the HGA for heat-assisted magnetic recording is to construct a radiation structure for effectively getting away the heat generated from a light source to attain a stable light emitting operation of the light source.

When a laser diode is used as a light source, the p-electrode surface of the laser diode is generally stuck on a substrate to be fixed. This is intended to more efficiently radiate the heat by directly getting the p-electrode into contact with the substrate to use the substrate as a heat-sink, because an active layer, which generates heat mostly during operations of the laser diode, is positioned closer to the p-electrode than an n-electrode. Actually, thermal conductivity of, for example, GaAs that is a typical constituent material of a laser diode, is about 47 W/mK, relatively small, and it is therefore desirable that the active layer is positioned closer to the substrate.

However, the thermal conductivity of, for example, ALTiC ($Al_2O_3$—TiC), which is a material generally used as a substrate, is about 25 W/mK, which is approximately one digit smaller than that of AlN (about 200 W/mK), AlN being a material generally used as one of heat-sink materials. Resultantly, it has been very difficult to radiate heat with sufficient quantity even if the p-electrode of the laser diode is stuck to the substrate. When the heat radiation of the laser diode is not enough, the light-emitting operation becomes unstable, and further, the laser diode itself is sometimes possible to be damaged.

Regarding the heat-radiation action on the heat generated in a magnetic head, for example, Black et al. "Thermal Management in Heat-Assisted Magnetic Recording" IEEE TRANSACTIONS ON MAGNETICS, Vol. 43, No. 1, p. 62-66 (2007) and McDaniel et al. "Issues in Heat-Assisted Perpendicular Recording" IEEE TRANSACTIONS ON MAGNETICS, Vol. 39, No. 4, p. 1972-1979 (2003) suggest that it is important to secure a heat flow from an air bearing surface (ABS) of a flying slider toward a magnetic recording medium. From this viewpoint, in the above-described heat-assisted magnetic recording head, the heat radiation through the ABS has not been enough, because the light source is positioned considerably separated apart from the ABS. Therefore, it is important to construct a radiation structure that does not depend only on simple radiation through a substrate.

SUMMARY OF THE INVENTION

Accordingly, it is an object of the present invention to provide an HGA with a radiation structure that can effectively get away the heat generated from a light source during the operations, and to provide a magnetic recording apparatus having the HGA(s).

Some terms used in the specification will be defined before explaining the present invention. In a layered structure or an element structure formed on an element-integration surface of a slider substrate of a slider according to the present invention, or in a layered structure or an element structure formed on an source-installation surface of a unit substrate in a light source unit according to the present invention, when viewed from a standard layer or element, a substrate side is defined as "lower" side, and the opposite side as an "upper" side. In a certain layer or element, a portion on the substrate side is defined as a "lower portion", and a portion on the opposite side as an "upper portion".

However, in a suspension or a flexure of the HGA according to the present invention, a surface facing the surface of a magnetic recording medium is defined to be a "lower surface", and a surface on the opposite side to be an "upper surface".

Further, in embodiments of the magnetic head according to the present invention, "X-, Y- and Z-axis directions" are indicated in some figures as needed. Here, Z-axis direction indicates above-described "up-and-low" direction, and +Z direction corresponds to a trailing side and −Z direction to a leading side. And Y-axis direction indicates a track width direction.

According to the present invention, an HGA is provided, which comprises: a suspension; and a heat-assisted magnetic recording head attached to the suspension and comprising a slider and a light source unit joined to the slider, the light source unit comprising: a unit substrate; and a light source provided on a source-installation surface of the unit substrate, the slider comprising: a slider substrate; and a head part formed on an element-integration surface perpendicular to an opposed-to-medium surface of the slider substrate, the head part comprising a write head element for writing data to a magnetic recording medium, a waveguide for guiding light being incident on an end opposite to the opposed-to-medium surface toward the opposed-to-medium surface, and at least one electrode, an end surface opposite to the opposed-to-medium surface of the slider substrate being bonded to the suspension, the suspension comprising an opening, and the light source unit projecting through the opening to an opposite side to the slider in relation to the suspension, a first pad being provided on an upper surface of the suspension, and a second pad provided on a lower surface of the suspension, and an end surface opposite to the source-installation surface of the light source being connected to the first pad by a first connection member, and the at least one electrode of the head part being connected to the second pad by a second connection member.

In the above-described HGA according to the present invention, provided as a radiation structure for the light source is: a heat flow path originating from the end surface opposite to the source-installation surface of the light source, and reaching the first pad through the first connection member; a heat flow path originating from the upper surface of the suspension (the first pad), and reaching the lower surface of the suspension (the second pad); a heat flow path originating from the second pad, and reaching the electrode of the head part through the second connection member; and a heat flow path originating from the electrode, and reaching the opposed-to-medium surface. Conclusively, the construction of the heat flow paths allows the heat generated from the light source during operations to be effectively radiated through the opposed-to-medium surface. Therefore, an effective radiation structure can be realized, without depending on the heat radiation simply through the unit substrate or the slider substrate.

In the HGA according to the present invention, the first pad and the second pad are preferably opposite to each other and are preferably positioned so as to sandwich said suspension. This arrangement can decrease the length of the heat flow path between the first and second pads up to the thickness of the suspension, and the thermal impedance of the heat flow path can be further reduced. Further, at least a portion of the suspension such as a flexure, including a portion to which the heat-assisted magnetic recording head is attached, preferably has a layered structure comprising a substrate and two electrically insulating layers provided so as to sandwich the substrate. The layered structure can form a desired heat flow path, while securing electrical insulation between the light source/the head part and suspension. In this case, the electrically insulating layer preferably includes polyimide resin, silicon carbide or aluminum nitride, or composite material composed of silicon carbide, aluminum nitride or metal, and polyimide resin. Further, the first connection member and the second connection member are preferably made of solder.

According to the present invention, a magnetic recording apparatus is further provided, which comprises: the above-described HGA; at least one magnetic recording medium; and a control circuit for controlling read/write operations performed by the heat-assisted magnetic recording head to the at least one magnetic recording medium and for controlling light-emitting operations of the light source.

Further objects and advantages of the present invention will be apparent from the following description of preferred embodiments of the invention as illustrated in the accompanying figures. In each figure, the same element as an element shown in other figure is indicated by the same reference numeral. Further, the ratio of dimensions within an element and between elements becomes arbitrary for viewability.

DESCRIPTION OF THE PREFERRED EMBODIMENTS

Figure 1:
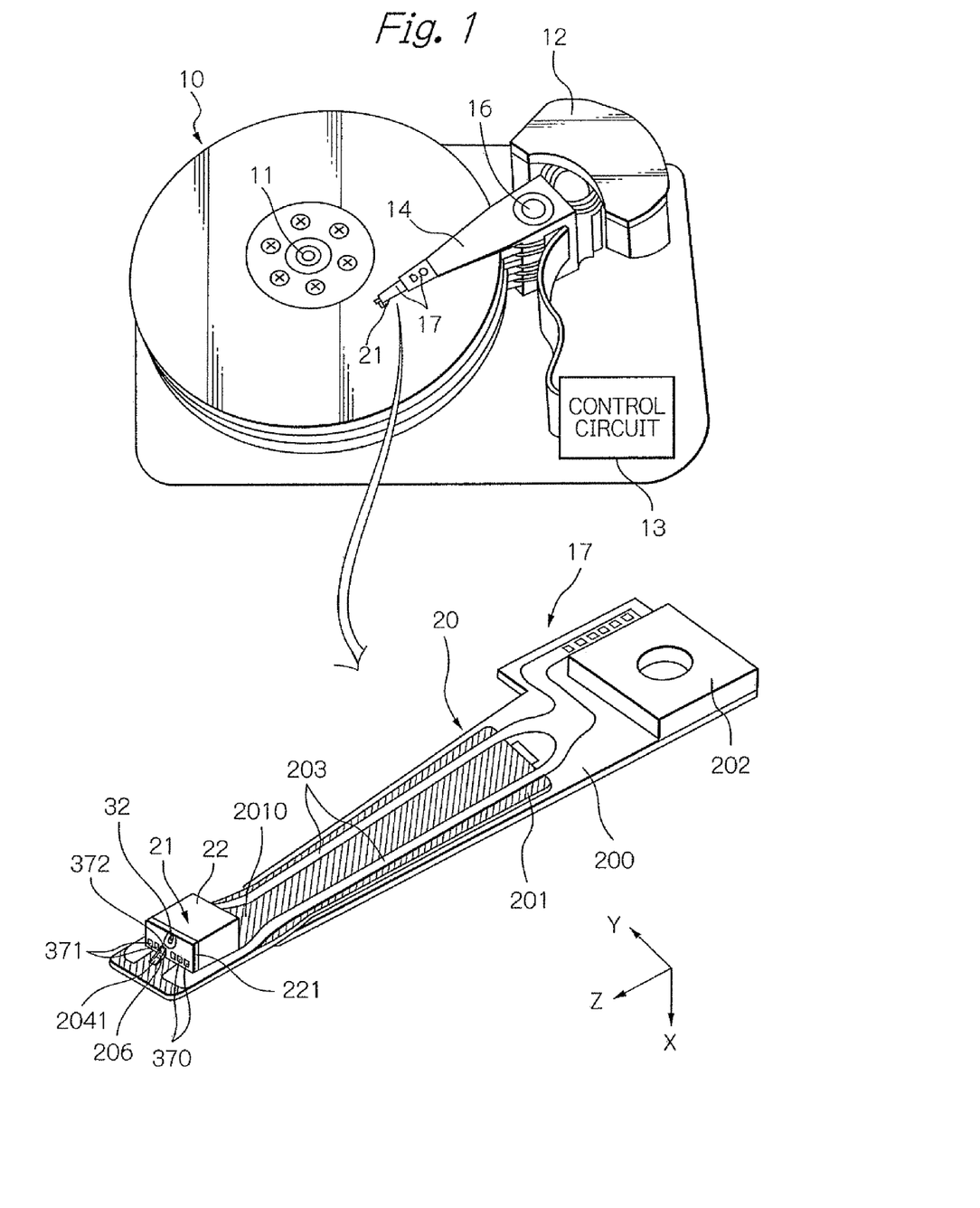
FIG. 1 shows a perspective view schematically illustrating a structure of a major part in one embodiment of a magnetic recording apparatus and an HGA according to the present invention.

FIG. 1 shows a perspective view schematically illustrating a structure of a major part in one embodiment of a magnetic recording apparatus and a head gimbal assembly (HGA) according to the present invention. Here, in the perspective view of the HGA, a lower surface 2010 of a suspension 20 of the HGA is presented as the upper side, the surface 2010 facing a magnetic-disk surface.

A magnetic disk apparatus as a magnetic recording apparatus shown in FIG. 1 includes: a plurality of magnetic disks 10 rotating around a rotational axis of a spindle motor 11; an assembly carriage device 12 provided with a plurality of drive arms 14 thereon; an HGA 17 attached on the top end portion of each drive arm 14 and provided with a heat-assisted magnetic recording head 21; and a recording/reproducing and light-emission control circuit 13 for controlling write/read operations of the heat-assisted magnetic recording head 21 and further for controlling the emission operation of a laser diode as a light source that generates laser light for heat-assisted magnetic recording, which will be described later.

The magnetic disk 10 is a magnetic recording medium for recording data, and has, for example, a structure in which sequentially stacked on a disk substrate is: a soft-magnetic under layer; an intermediate layer; and a magnetic recording layer (perpendicular magnetization layer) when the disk 10 is for perpendicular magnetic recording. The assembly carriage device 12 is a device for positioning the heat-assisted magnetic recording head 21 above a track formed on the magnetic recording layer of the magnetic disk 10, on which recording bits are aligned. In the apparatus, the drive arms 14 are stacked in a direction along a pivot bearing axis 16 and can be angularly swung around the axis 16 by a voice coil motor (VCM) 15. The structure of the magnetic disk apparatus according to the present invention is not limited to that described above. For instance, the number of each of magnetic disks 10, drive arms 14, HGAs 17 and sliders 22 may be one.

Referring also to FIG. 1, a suspension 20 in the HGA 17 includes a load beam 200, a flexure 201 with elasticity fixed to the load beam 200, and a base plate 202 provided on the base portion of the load beam 200. Further, on the flexure 201, there is provided a wiring member 203 that is made up of lead conductors and connection pads electrically joined to both ends of the lead conductors. The heat-assisted magnetic recording head 21 is fixed to the flexure 201 at the top end portion of the suspension 20 so as to face the surface of each magnetic disk 10 with a predetermined space (flying height). Moreover, one ends of the wiring member 203 are electrically connected to terminal electrodes of the heat-assisted magnetic recording head 21.

Figure 2:
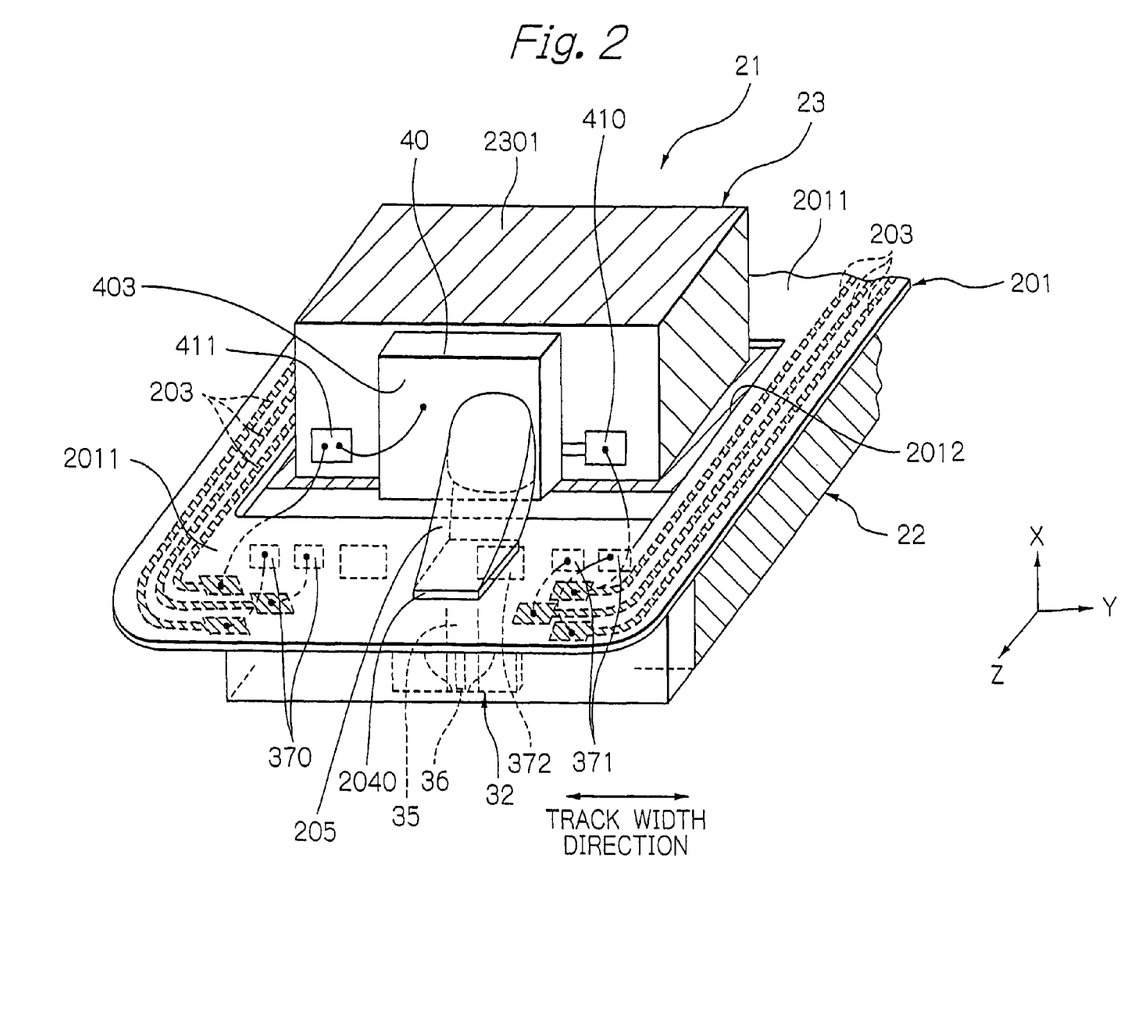
FIG. 2 shows a perspective view illustrating a structure of the portion in which a heat-assisted magnetic recording head is attached, in one embodiment of the HGA according to the present invention.

The heat-assisted magnetic recording head 21, as will be detailed later, has a structure in which a slider 22 is joined with a light source unit 23 provided with a laser diode 40 as a light source for the heat-assisted magnetic recording (FIG. 2). In FIG. 1, the slider 22 only is presented. On the upper surface of a head part 221 in which a head element 32 of the slider 22 is formed, there are provided a pair of terminal electrodes 370 and a pair of terminal electrodes 371 for the head element 32, and further, two terminal electrodes including a terminal electrode 372. Moreover, on a lower surface 2010 of the flexure 201, there is provided a second radiation pad 2041, and this second radiation pad 2041 and the terminal electrode 372 are connected by a second connection member 206. As will be described in detail later, a heat flow path from the second radiation pad 2041 up to the terminal electrode 372 through the second connection member 206 serves as one part of the radiation structure for the laser diode 40 (FIG. 2).

The flexure 201, as will be described in detail later, preferably has a three-layered structure including a substrate made of metal material such as stainless steel, and two electrically insulating layers provided so as to sandwich the substrate therebetween. Here, at least a part of the lead conductors of the wiring member 203 may be provided within the electrically insulating layer to be integrated with the flexure 201. The structure of the suspension 20 is not limited to the above-described one. An IC chip for driving the head may be mounted midway on the suspension 20, though not shown.

FIG. 2 shows a perspective view illustrating a structure of the portion in which the heat-assisted magnetic recording head 21 is attached, in one embodiment of the HGA according to the present invention. In the perspective view, the upper surface 2011 of the suspension 20 in the HGA 17 is presented as the upper side, the upper surface 2011 being on the opposite side to the lower surface 2010 facing the magnetic disk surface.

Referring to FIG. 2, the heat-assisted magnetic recording head 21 includes a light source unit 23 with a laser diode 40 as a light source, and a slider 22 which includes: a head element 32 for writing and reading data; a waveguide 35 for guiding the laser light from the laser diode 40 to the opposed-to-medium surface side; and a near-field light generating element (plasmon antenna) 36, the light source unit 23 being joined with the slider 22. The flexure 201 has an opening 2010, and the light source unit 23 projects through opening 2010 on the opposite side to the slider 22 in relation to the flexure 201. A portion of the end surface (back surface) of the slider 22, which is not joined with the light source unit 23, is bonded to the flexure 201, the end surface (back surface) being on the opposite side to the opposed-to-medium surface of the slider 22. According to the embodiment for attaching the head 21 to the flexure 201, it is possible to attain stable fixing and proper electrical connection described below, even in the case that the light source unit 23 projects from the slider 22.

The slider 22 includes a pair of terminal electrodes 370 and a pair of terminal electrodes 371 for the head element 32, and further, two terminal electrodes including a terminal electrode 372. The terminal electrodes 370 and 371 are electrically connected to the connection pads of the wiring member 203 provided on the flexure 201. The light source unit 23 includes two terminal electrodes 410 and 411 for the laser diode 40, and these terminal electrodes 410 and 411 are also electrically connected to the connection pads of the wiring member 203 provided on the flexure 201.

Furthermore, on the upper surface 2011 of the flexure 201, there is provided a first radiation pad 2040, which is connected to the upper surface 403 of the laser diode 40 by a first connection member 205. As will be described in detail later, a heat flow path, which originates from the upper surface 403 of the laser diode 40 and reaches the first radiation pad 2040 through the first connection member 205, serves as one part of the radiation structure for the laser diode 40.

Figure 3:
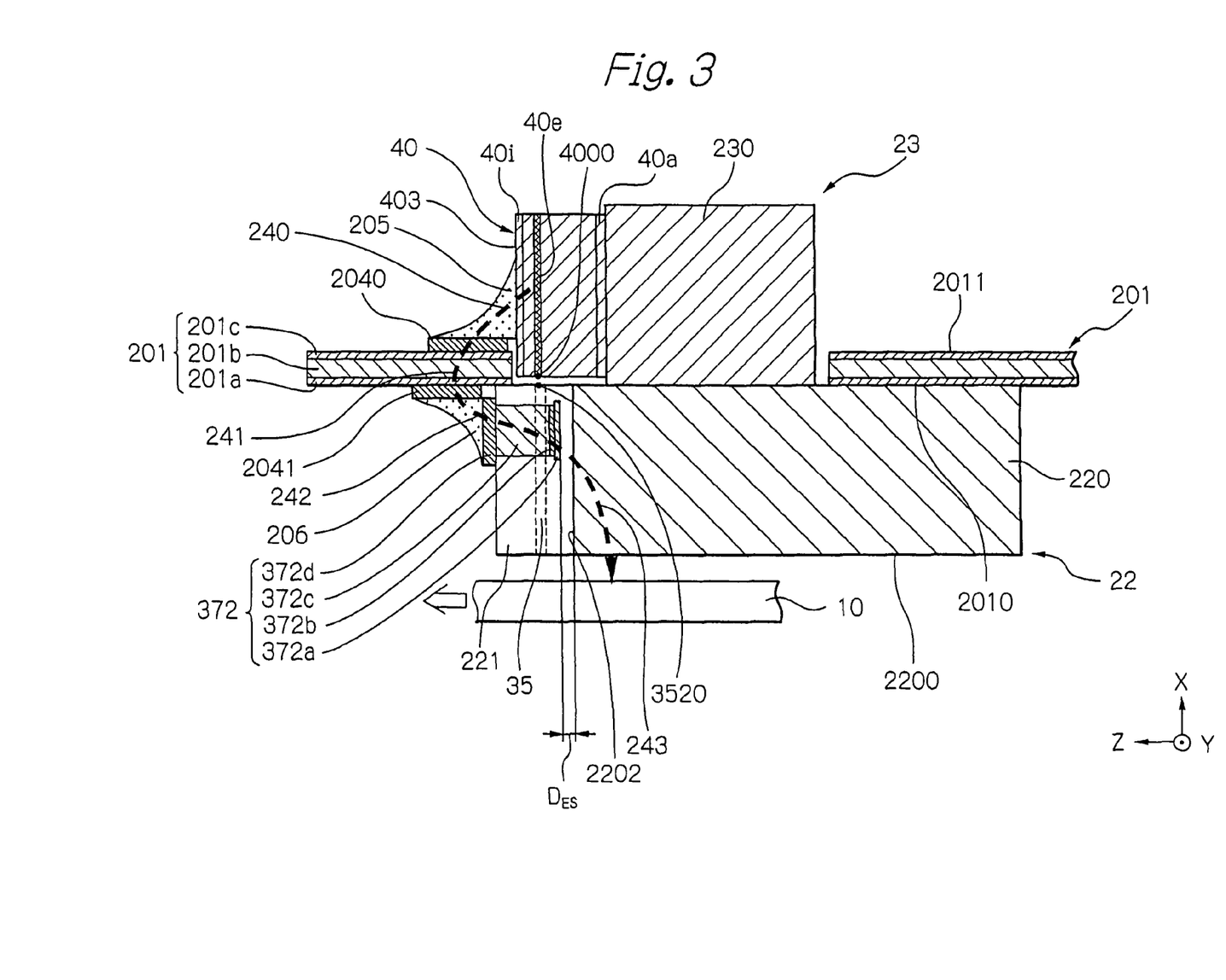
FIG. 3 shows a cross-sectional view taken by ZX-plane, illustrating the portion in which a heat-assisted magnetic recording head is attached, in one embodiment of the HGA according to the present invention.

FIG. 3 shows a cross-sectional view taken by ZX-plane, illustrating the portion in which the heat-assisted magnetic recording head 21 is attached, in one embodiment of the HGA 17 according to the present invention.

Referring to FIG. 3, the laser diode 40 is fixed to a unit substrate 230 with its n-electrode 40a surface stuck to the unit substrate 230. In the laser diode 40, generally, the active layer 40e, which is a light-emission source of the laser light and generates heat mostly during operations, is positioned closer to the p-electrode 40i than the n-electrode 40a. Accordingly, the active layer 40e is positioned closer to the upper surface 403 of the laser diode 40, the surface 403 serving as a reference for position adjustment between the light source unit 23 and the slider 22. This can resultantly facilitate positioning (light-axis alignment) in YZ-plane between a light-emission center 4000 locating at the position of active layer 40e and an incident center 3520 of the waveguide 35, and makes it possible to improve the positioning accuracy.

However, in the laser diode 40 shown in FIG. 3, the active layer 40e is positioned separated apart from the unit substrate 230, compared to a case that the surface of p-electrode 40i is stuck to the unit substrate 230. Therefore, even when unit substrate 230 is intended to be used as a heat-sink, the effect cannot be expected so much. Actually, the thermal conductivity of, for example, GaAs which is a typical constituent material of a laser diode, is about 47 W/mK, relatively small, and therefore the effect of using the unit substrate 230 as a heat-sink is reduced as the active layer 40e is separated farther from the unit substrate 230.

The thermal conductivity of, for example, ALTIC ($Al_2O_3$—TiC), which is a material generally used as the unit substrate 230, is about 25 W/mK, which is approximately one order smaller than that of AlN (about 200 W/mK), AlN being a material generally used as one of heat-sink materials. Accordingly, even in the case that the surface of the p-electrode 40i is stuck to the unit substrate 230, there may arise a problem that sufficient heat radiation cannot be attained.

With respect to the heat-radiation action on the heat generated in a magnetic head, for example, Black et al. "Thermal Management in Heat-Assisted Magnetic Recording" IEEE TRANSACTIONS ON MAGNETICS, Vol. 43, No. 1, p. 62-66 (2007) and McDaniel et al. "Issues in Heat-Assisted Perpendicular Recording" IEEE TRANSACTIONS ON MAGNETICS, Vol. 39, No. 4, p. 1972-1979 (2003) disclose that it is important to secure a heat flow from the air bearing surface (ABS) of a flying slider toward a magnetic recording medium. That is, they suggest that a cooling action due to a laminar flow generated by the rotation of the magnetic recording medium is important in the ABS of the flying slider. From the viewpoint of this suggestion, because the laser diode 40 is positioned considerably separated apart from the ABS 2200 of the slider 22, it is not enough to simply utilize the unit substrate 230 or the slider substrate 220 of the slider 22 for heat radiation through that.

Referring again to FIG. 3, as a radiation structure for the laser diode 40, there are provided: the heat flow path 240 which, as described in FIG. 2, originates from the upper surface 403 of the laser diode 40 and reaches the first radiation pad 2040 through the first connection member 205; a heat flow path 241 which originates from the upper surface 2011 of the flexure 201 (the first radiation pad 2040) and reaches the lower surface 2010 (the second radiation pad 2041); a heat flow path 242 which, as described in FIG. 1, originates from the second radiation pad 2041 and reaches the terminal electrode 372 through the second connection member 206; and a heat flow path 243 originating from the terminal electrode 372 and reaching the ABS 2200. Passing through these heat flow paths 240-243, the heat generated from the laser diode 40 during operations can be finally radiated toward the magnetic disk 10 through the ABS 2200 effectively. Thus, an effective radiation structure can be realized, without depending on the heat radiation simply through the unit substrate 230 or the slider substrate 220.

In the heat flow path 240, the first connection member 205, which connects the upper surface 403 (p-electrode surface) of the laser diode 40 to the first radiation pad 2040, is preferably made of solder composed of, for example, metal material including such as Sn, Pb, Ag, Cu, Zn, Al, Bi, or In. In this case, a solder ball bonding (SBB) process can be applied between the upper surface 403 and the first radiation pad 2040 to form the first connection member 205. By using the first connection member 205 with high thermal conductivity as described above, the thermal impedance of the heat flow path 240 can be reduced. Moreover, when the first radiation pad 2040 has a sufficiently large size of, for example, approximately 80 µm×100 µm and soldering is applied thereto so as to cover most of the surface of the radiation pad 2040, the thermal impedance can be further reduced.

In the heat flow path 241, the flexure 201 has a layered structure including: a flexure substrate 201b made of, for example, metal such as stainless steel, with thickness of, for example, approximately 10-50 µm; and two electrically insulating layers 201a and 201c provided so as to sandwich the substrate 201b therebetween. By providing these insulating layers 201a and 201c, the heat flow path 241 can be formed while electrical insulation is secured between the flexure 201 and the first radiation pad 2040 and the second radiation pad 2041, that is, between the flexure 201 and the laser diode 40 and the head part 221. The electrically insulating layers 201a and 201c may be formed of, for example, polyimide resin. The polyimide resin means a resin composed of polymers containing imide group, such as polyimides, polyamideimides, polysiloxaneimides, polybenzimidazoleimides, polyetherimides, and polyesterimides. Moreover, as the electrically insulating layers 201a and 201c, there may be used SiC (silicon carbide) or AlN (aluminum nitride) which have higher thermal conductivity than the polyimide resin. Furthermore, by using composite material composed of SiC, AlN, or metal such as Cu, and polyimide resin as the insulating layers 201a and 201c, the thermal impedance of the heat flow path 241 can be reduced further. The thickness of the insulating layers 201a and 201c is, for example, about 2-20 µm; the thickness may be selected so as to suppress the thermal impedance within a permissible level while attaining sufficient electrical insulation.

In the heat flow path 242, the second connection member 206, which connects the second radiation pad 2041 to the terminal electrode 372, is also preferably made of solder, composed of, for example, metal material including such as Sn, Pb, Ag, Cu, Zn, Al, Bi or In. In this case, the solder ball bonding (SBB) process can be applied between the second radiation pad 2041 and the terminal electrode 372 to form the second connection member 206. By using the second connection member 206 with high thermal conductivity as described above, the thermal impedance of the heat flow path 242 can be reduced. Moreover, when the second radiation pad 2041 has a sufficiently large size of, for example, approximately 80 µm×100 µm and soldering is applied thereto so as to cover most of the surface of the radiation pad 2041, the thermal impedance can be further reduced.

Here, it is preferable that the first radiation pad 2040 and the second radiation pad 2041 are positioned such that they sandwich the flexure 201 and are opposite to each other with their portions overlapped. This arrangement can decrease the length of the heat flow path 242 up to the thickness of the flexure 201, and the thermal impedance of the heat flow path 242 can be further reduced.

Lastly, in the heat flow path 243, when, for example, a heating element (not shown) is provided for adjusting the flying height of the head 21, one of terminal electrodes for supplying electric power to the heating element may be used as the terminal electrode 372. It is also possible to use one of the pair of electrodes 371 for an electromagnetic transducer 34 for writing data, which will be described later, instead of the terminal electrode 372. Anyway, it is possible to form the heat flow path 243 without providing a new terminal electrode. In these cases, the terminal electrode 372 may have, for example, a lead electrode 372a, an electrode-film member 372b, a bump 372c, and a pad 372d. Here, the lead electrode 372a is electrically joined to a lead wire led from, for example, the above-described electromagnetic transducer 34 or heating element. On the lead electrode 372a, the electrode-film member 372b with conductivity is formed, and further, the bump 372c is formed by a plating process with the electrode-film member 372b used as an electrode. The electrode-film member 372b and the bump 372c are made of conductive material such as Cu. The thickness of the electrode-film member 372b is, for example, approximately 10-200 nm, and the thickness of the bump 372c is, for example, approximately 5-40 μm. Here, the upper end surface of the bump 372c is exposed from the upper surface of the head part 221, and on the upper end surface, the electrode pad 372d is provided. Any of these structural elements have high thermal conductivity to thereby further reduce the thermal impedance of the heat flow path 243.

A space between the lower end surface of the terminal electrode 372 and the element-integration surface 2202 of the slider substrate 220 is filled up with insulating material such as $Al_2O_3$ (alumina) and $SiO_2$ (silicon dioxide), which forms a portion of the head part 221 (overcoat layer 38 (FIG. 5)), and the thermal conductivity of this portion is not so high. Therefore, the distance DES (FIG. 3) between the lower end surface of the terminal electrode 372 and the element-integration surface 2202 of the slider substrate 220 is made smaller enough up to, for example, approximately 0.1-1.0 μm, whereby the thermal impedance of the heat flow path 243 can be maintained to a small value.

As described above, the heat flow paths 240 to 243 are constructed, the paths originating from the laser diode 40, sequentially passing through the first connection member 205, the first radiation pad 2040, the electrically insulating layer 201c, the flexure substrate 201b, the electrically insulating layer 201a, the second radiation pad 2041, the second connection member 206 and terminal electrode 372, and reaching the ABS 2200. It is understood that the construction of the heat flow paths allows effective radiation of the heat generated from the laser diode 40. Alternatively, a plurality of pairs of radiation pads may be provided on both the upper surface and the lower surface of the flexure 201 respectively, and by using a plurality of terminal electrodes provided on the head part 221, a plurality of heat flow paths from the laser diode 40 up to the ABS 2200 can be provided. This can effects more excellent heat radiation.

Figure 4A:
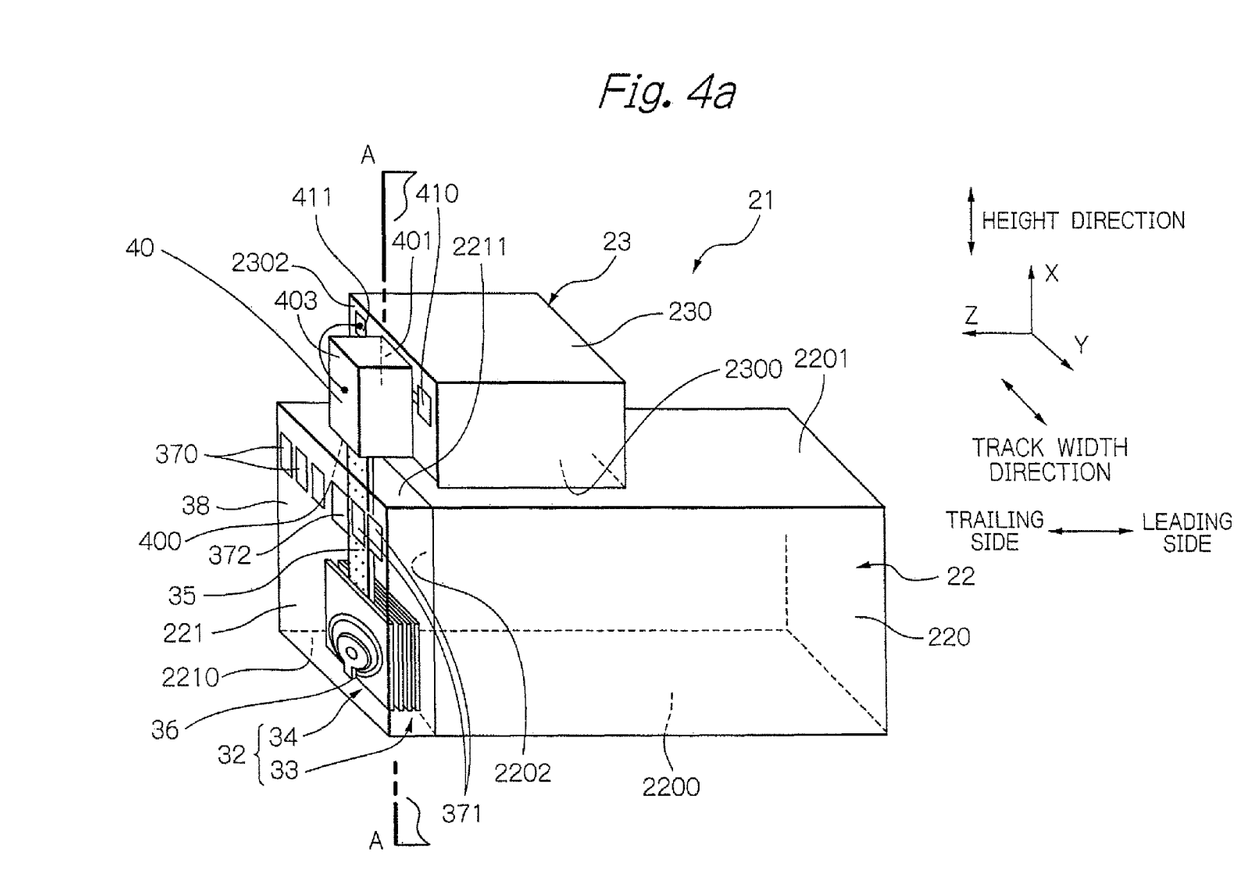
FIG. 4a shows a perspective view illustrating one embodiment of the heat-assisted magnetic recording head before being attached to the suspension.
Figure 4B:
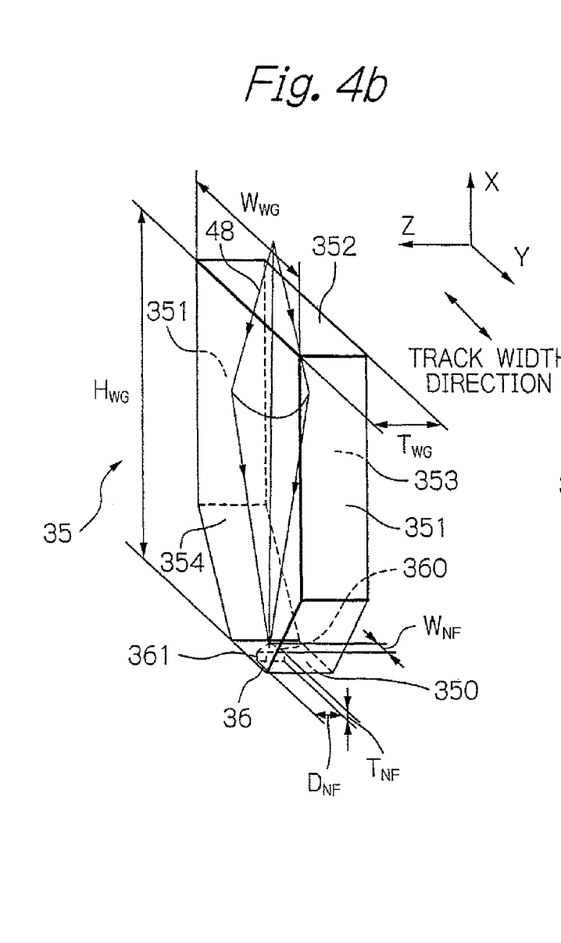
FIG. 4b shows a perspective view illustrating one embodiment of the waveguide and the near-field light generating element.
Figure 4C:
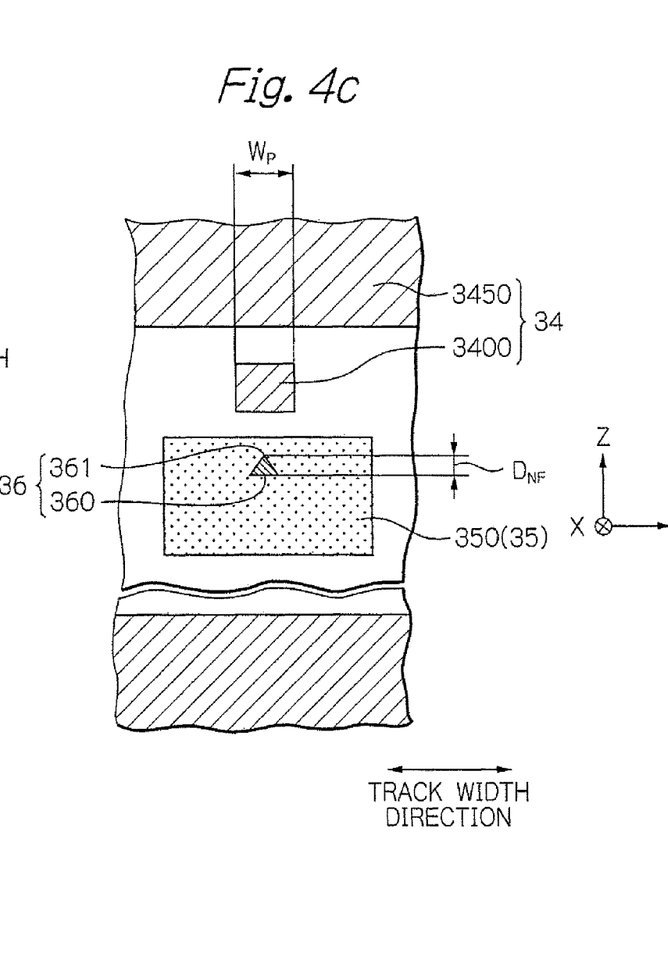
FIG. 4c shows a plain view illustrating the shapes on the head-part end surface of the ends of the electromagnetic transducer, the waveguide and the near-field light generating element.

FIG. 4a shows a perspective view illustrating one embodiment of heat-assisted magnetic recording head 21 before being attached to the suspension. FIG. 4b shows a perspective view illustrating one embodiment of waveguide 35 and near-field light generating element 36. Further, FIG. 4c shows a plain view illustrating the shapes on the head-part end surface 2210 of the ends of electromagnetic transducer 34, waveguide 35 and near-field light generating element 36.

As shown in FIG. 4a, a heat-assisted magnetic recording head 21 is constituted of the slider 22 and the light source unit 23 as described above.

The slider 22 includes: a slider substrate 220 having an ABS 2200 processed so as to provide an appropriate flying height, and formed of, for example, AlTiC ($Al_2O_3$—TiC); and a head part 221 formed on an element-integration surface 2202 perpendicular to the ABS 2200. While, the light source unit 23 includes: a unit substrate 230 having a joining surface 2300, and formed of, for example, AlTiC ($Al_2O_3$—TiC); and a laser diode 40 as a light source provided on a source-installation surface 2302 perpendicular to the joining surface 2300. The slider 22 and the light source unit 23 are adhered to each other so that the back surface 2201 of the slider substrate 220 and the joining surface 2300 of the unit substrate 230 have a surface contact with each other. Here, the back surface 2201 of the slider substrate 220 is defined as an end surface opposite to the ABS 2200 of the slider substrate 220.

In the slider 22, the head part 221 formed on the element-integration surface 2202 of the slider substrate 220 includes: a head element 32 constituted of a magnetoresistive (MR) element 33 for reading data from the magnetic disk and an electromagnetic transducer 34 for writing data to the magnetic disk; a waveguide 35 provided through between the MR element 33 and the electromagnetic transducer 34 in the present embodiment; a near-field light generating element (plasmon antenna) 36 for generating near-field light to heat a portion of the magnetic record layer of the magnetic disk; an overcoat layer 38 formed on the element-integration surface 2202, so as to cover the MR element 33, the electromagnetic transducer 34, the waveguide 35 and the near-field light generating element 36; a pair of terminal electrodes 370 exposed in the upper surface of the overcoat layer 38 and electrically connected to the MR element 33; a pair of terminal electrodes 371 also exposed in the upper surface of the overcoat layer 38 and electrically connected to the electromagnetic transducer 34; and a terminal electrode 372 forming a heat flow path described above and serving as a part of the radiation structure for the laser diode 40.

One ends of the MR element 33, the electromagnetic transducer 34 and the near-field light generating element 36 reach the head-part end surface 2210 of the head part 221, which is opposed to the medium surface. Here, the head-part end surface 2210 and the ABS 2200 constitute the whole medium-opposed surface of the heat-assisted magnetic recording head 21. During actual write and read operations, the heat-assisted magnetic recording head 21 aerodynamically flies above the surface of the rotating magnetic disk with a predetermined flying height. Thus, the ends of the MR element 33 and electromagnetic transducer 34 face the surface of the magnetic record layer of the magnetic disk with a appropriate magnetic spacing. Then, MR element 33 reads data by sensing signal magnetic field from the magnetic record layer, and the electromagnetic transducer 34 writes data by applying signal magnetic field to the magnetic record layer. When writing data, laser light, which is generated from the laser diode 40 of the light source unit 23 and propagates through the waveguide 35, is irradiated onto the near-field light generating element 36. The irradiation causes near-field light to be generated from the end of the near-field light generating element 36, extending to the head-part end surface 2210. The generated near-field light reaches the surface of the magnetic disk, and heats a portion of the magnetic record layer of the magnetic disk. As a result, the anisotropic magnetic field (coercive force) of the portion is decreased to a value that enables writing; thus the heat-assisted magnetic recording can be accomplished.

The waveguide 35 is positioned, as shown in FIG. 4a, parallel to the element-integration surface 2202 and between the MR element 33 and the electromagnetic transducer 34. And the waveguide 35 extends from its end surface 350 on the head-part end surface 2210 to the opposite end surface 352 on the head-part end surface 2211. The waveguide 35 may have a rectangular parallelepiped shape, or may have a portion on the head-part end surface 2210 side, which tapers in the track width direction (Y-axis direction), as shown in FIG. 4b. The width $W_{WG}$ in the track width direction (Y-axis direction) of the waveguide 35 may be, for example, in the range approximately from 1 to 200 μm (micrometers), and the thickness $T_{WG}$ (in Z-axis direction) may be, for example, in the range approximately from 2 to 10 μm, and the height $H_{WG}$ (in X-axis direction) may be, for example, in the range approximately from 10 to 300 μm.

Further, as shown in FIG. 4b, both the side surfaces 351, the lower surface 353 and the upper surface 354 of the waveguide 35 have a contact with the overcoat layer 38 (FIG. 4a). The waveguide 35 is formed of a dielectric material with refractive index n higher than that of the constituent material of the overcoat layer 38, made by using, for example, a sputtering method. For example, in the case that the overcoat layer 38 is formed of $SiO_2$ (n=1.5), the waveguide 35 can be formed of, for example, $Al_2O_3$ (n=1.63). Further, in the case that the overcoat layer 38 is formed of $Al_2O_3$ (n=1.63), the waveguide 35 can be formed of, for example, $SiO_xO_Y$ (n=1.7-1.85), $Ta_2O_5$ (n=2.16), $Nb_2O_5$ (n=2.33), TiO (n=2.3-2.55) or $TiO_2$ (n=2.3-2.55). This material structure of the waveguide 35 not only enables the propagation loss of laser light to be reduced due to the excellent optical characteristics of the constituent material, but also provides the total reflection in both the side surfaces 351, the lower surface 353 and the upper surface 354 due to the existence of the overcoat layer 38 as a clad. As a result, more amount of laser light can reach the near-field light generating element 36, which improves the efficiency of generating the near-field light.

As shown in FIGS. 4b and 4c, the near-field light generating element 36 is a plate-like member provided on the end surface 350 of the waveguide 35, one end surface of which reaches the head-part end surface 2210. In the present embodiment, when viewing from the head-part end surface 2210 side (as shown in FIG. 4c), the near-field light generating element 36 has a triangular shape with a bottom edge 360 extending in the track width direction and an apex 361 positioned on the electromagnetic transducer 34 side of the bottom edge 360 (on the trailing side). The triangular shape is preferably an isosceles triangle in which base angles in both ends of the bottom edge 360 are equal. The apex 361 is positioned so as to be opposed to the edge on the leading side of a main magnetic pole 3400 of the electromagnetic transducer 34 described later. The main magnetic pole layer 340 has, when viewing from the head-part end surface 2210 side (as shown in FIG. 4c), a rectangular or square shape, or may have a trapezoidal shape. In either case, the apex 361 of the near-field light generating element 36 is positioned near the edge on the leading side of the main magnetic pole 3400.

Under the above-described configuration on the head-part end surface 2210, irradiating laser light 48 to the near-field light generating element 36 causes near-field light to be generated mainly from the apex 361 due to the concentration of electric field in the vicinity of the apex 361. That is, the apex 361 and its vicinity becomes a main heating portion during the heat-assisted operation of heating a portion of the magnetic record layer of the magnetic disk. Further, because the apex 361 and its vicinity as a main heating portion is positioned much close to the main magnetic pole 3400 as a writing portion, write magnetic field can be applied shortly after applying heat to a portion of the magnetic record layer. As a result, stable write operation with the heat-assist can be performed reliably. The form of the near-field light generating element 36 is not limited to the above-described one; further, it is possible for the laser light emitting from the end surface 350 of the waveguide 35 to directly heat the magnetic recording layer, without any near-field light generating element in the slider 22.

The near-field light generating element 36 is preferably formed of a conductive material such as Au, Ag, Al, Cu, Pd, Pt, Rh or Ir, or the alloy of at least two of these elements. Further, the apex 361 of the element 36 preferably has a curvature radius in the range 5 to 100 nm (nanometers). It is preferable that the distance $D_{NF}$ in Z-axis direction between the bottom edge 360 and the apex 361 is sufficiently smaller than the wavelength of the incident laser light, being preferably in the range of 20 to 400 nm. It is also preferable that the width $W_{NF}$ of the bottom edge 360 is sufficiently smaller than the wavelength of the incident laser light 48, being preferably in the range of 20 to 400 nm. Further, the thickness $T_{NF}$ in X-axis direction of the near-field light generating element 36 is preferably in the range of 10 to 100 nm.

Furthermore, it is preferable that the waveguide 35 has a multilayered structure of dielectric materials in which the upper a layer is, the higher becomes the refractive index n of the layer. The multilayered structure can be realized, for example, by sequentially stacking dielectric materials of $SiO_xN_Y$ with the composition ratio X and Y appropriately changed. The number of stacked layers may be, for example, in the range from 8 to 12. In the case that laser light 48 is linearly polarized in Z-axis direction, the above-described structure enables a light spot on the end surface 350 of the laser light 48 to be closer to the electromagnetic transducer 34 (on the trailing side) in Z-axis direction (in the direction along thickness $T_{WG}$). As a result, the near-field light generating element 36 can be provided much closer to the electromagnetic transducer 34 (on the trailing side) on the end surface 350. That is, the apex 361 of the near-field light generating element 36 is positioned more adjacent to the edge on the leading side of the main magnetic pole 3400 of the electromagnetic transducer 34 described later, which enables near-field light to be irradiated more adequately on the write position at the time of writing.

Backing to FIG. 4a, the light source unit 23 includes: the unit substrate 230, the laser diode 40 provided on the source-installation surface 2302 of the unit substrate 23; the terminal electrode 410 electrically connected to the lower surface 401 as an electrode of the laser diode 40; and the terminal electrode 411 electrically connected to the upper surface 403 as an electrode of the laser diode 40. By applying a predetermined voltage between both electrodes 410 and 411 of the laser diode 40, laser light radiates from the emission center on an emission surface 400 of the laser diode 40.

Each of the terminal electrodes 410 and 411 includes: a base layer formed on the source-installation surface 2302 of the unit substrate 230, made of, for example, Ta or Ti with thickness of approximately 10 nm; and a conductive layer formed on the base layer, made of, for example, Au or Cu with thickness of approximately 1 to 3 μm. As shown in FIG. 4a, the terminal electrode 410 may be electrically connected to the lead line extended from the lower surface 401 as an electrode of the laser diode 40, and the terminal electrode 411 may be electrically connected through a boding wire to the upper surface 403 as an electrode of the laser diode 40.

As explained above, the heat-assisted magnetic recording head 21 has a structure in which the slider 22 and the light source unit 23 are joined to each other. Therefore, the head 21 can be fabricated after the slider 22 and the light source unit 23 are manufactured independently of each other. As a result, for example, the characteristics of the light source unit 23 can be evaluated in advance; then only the non-defective unit can be used for the head fabrication. In this case, the manufacturing yield for obtaining the whole head becomes almost the same as the manufacturing yield of the slider 22. Therefore, the degradation of the manufacturing yield for obtaining the whole head can be avoided, the degradation depending on the percent defective of the laser diode 40. Further, because the light source unit 23 is joined to the back surface 2201 opposite to the ABS 2200 of the slider 22, the laser diode 40 can be definitely located far away from the ABS 2200. As a result, the direct mechanical shock to the laser diode 40 during operation can be avoided. Further, the head 21 has an affinity with the conventional manufacturing method of thin-film magnetic heads because the ABS 2200 and the element-integration surface 2202 are perpendicular to each other in the slider 22. Furthermore, the heat-assisted magnetic recording head 21 can be manufactured with reduced man-hour and at low cost, because of no need to provide the head 21 with optical components such as a lens or prism which are required to have much high accuracy, or optical elements having a special structure for connecting optical fibers or the like.

Each of the slider 22 and light source unit 23 may have an arbitrary size. For example, the slider 22 may be so-called a femto slider in which the width in the track width direction (Y-axis direction) is 700 μm; the length in Z-axis direction is 850 μm; and the thickness in X-axis direction is 230 μm. In the case, the light source unit 23 may be one size smaller than the slider 22, for example, in which the width in the track width direction is 425 μm; the length is 300 μm; and the thickness is 300 μm.

Figure 5:
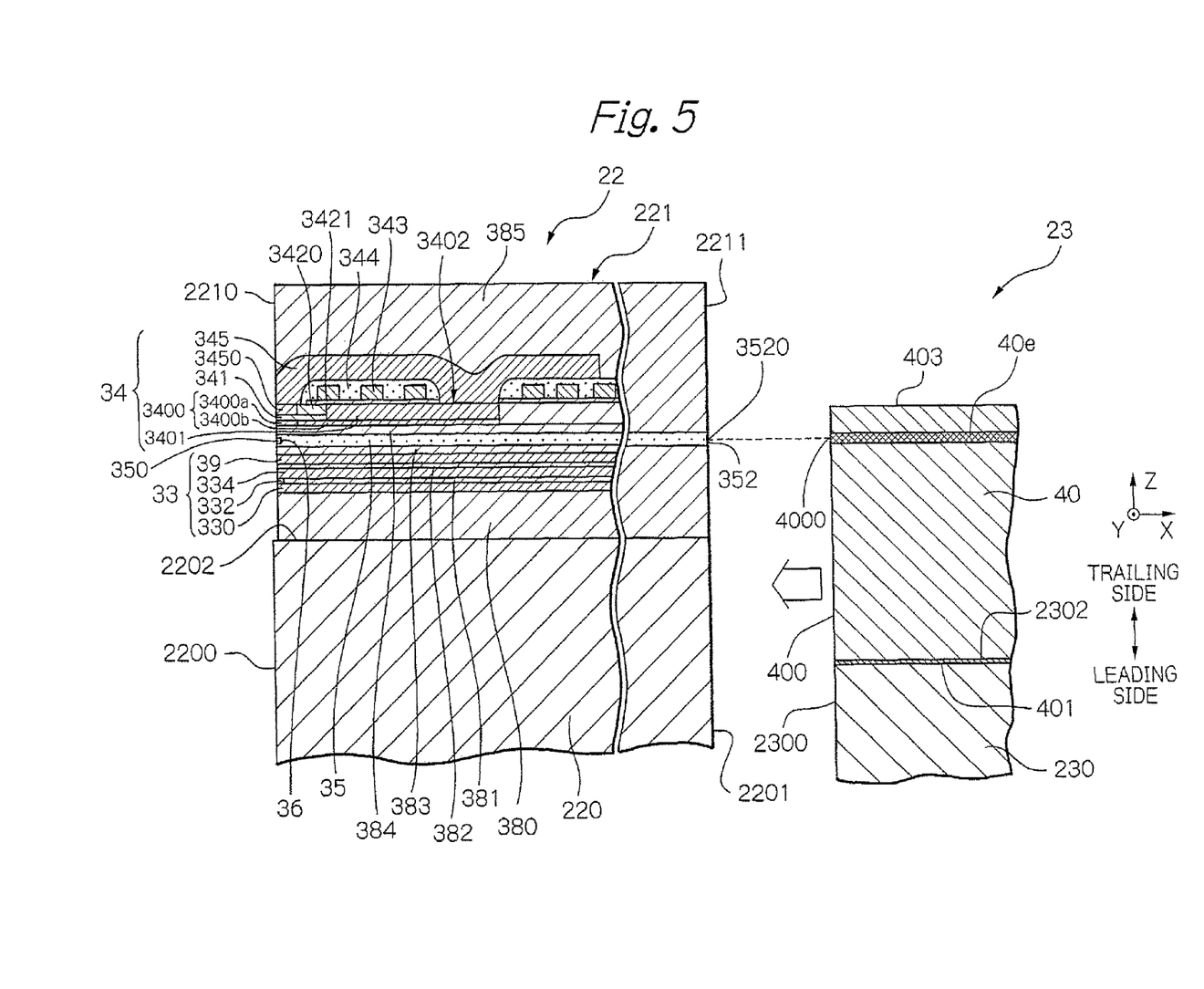
FIG. 5 shows a cross-sectional view taken by plane A in FIG. 4a, schematically illustrating a main part of the heat-assisted magnetic recording head.

FIG. 5 shows a cross-sectional view taken by plane A in FIG. 4a, schematically illustrating a main part of the heat-assisted magnetic recording head 21.

As shown in FIG. 5, the MR element 33 is formed on the insulating layer 380 stacked on the element-integration surface 2202, and includes: an MR multilayer 332; and a lower shield layer 330 and an upper shield layer 334 which sandwich the MR multilayer 332 and the insulating layer 381 therebetween. The upper and lower shield layers 334 and 330 prevent the MR multilayer 332 from receiving external magnetic field as a noise. The upper and lower shield layers 334 and 330 are magnetic layers formed of soft-magnetic materials such as NiFe (Permalloy), FeSiAl (Sendust), CoFeNi, CoFe, FeN, FeZrN or CoZrTaCr, or the multilayer of at least two of these materials, with thickness of approximately 0.3 to 5 μm.

The MR multilayer 332 is a magneto-sensitive part for detecting signal magnetic field by using MR effect. The MR multilayer 332 may be, for example: a current-in-plane giant magnetoresistive (CIP-GMR) multilayer that utilizes CIP-GMR effect; a current-perpendicular-to-plane giant magnetoresistive (CPP-GMR) multilayer that utilizes CPP-GMR effect; or a tunnel magnetoresistive (TMR) multilayer that utilizes TMR effect. The MR multilayer 332 that utilizes any MR effect described above can detect signal magnetic field from the magnetic disk with high sensitivity. In the case that the MR multilayer 332 is a CPP-GMR multilayer or a TMR multilayer, the upper and lower shield layers 334 and 330 act as electrodes. Whereas, in the case that the MR multilayer 332 is a CIP-GMR multilayer, insulating layers are provided between the MR multilayer 332 and respective upper and lower shield layers 334 and 330; further, formed are MR lead layers that is electrically connected to the MR multilayer 332.

In the case of TMR multilayer, for example, the MR multilayer 332 may have a stacked structure in which sequentially stacked are: an antiferromagnetic layer made of, for example, IrMn, PtMn, NiMn or RuRhMn, with thickness of approximately 5 to 15 nm; a magnetization-direction-fixed layer (pinned layer) in which two ferromagnetic layers such as CoFe sandwich a non-magnetic metal layer such as Ru therebetween, and the direction of the magnetization is fixed by the antiferromagnetic layer; a tunnel barrier layer made of a non-magnetic dielectric material obtained by the process that a metal film such as Al or AlCu, for example, with thickness of approximately 0.5 to 1 nm is oxidized by oxygen introduced into the vacuum equipment, or is naturally oxidized; and a magnetization-direction-free layer (free layer) having a double-layered structure of a ferromagnetic material such as CoFe, for example, with thickness of approximately 1 nm and a ferromagnetic material such as NiFe, for example, with thickness of approximately 3 to 4 nm, which has a tunnel exchange interaction with the pinned layer through the tunnel barrier layer.

Also as shown in FIG. 5, the electromagnetic transducer 34 is designed for perpendicular magnetic recording, and includes a main magnetic pole layer 340, a gap layer 341, a write coil layer 343, a coil insulating layer 344, and a write shield layer 345.

The main magnetic pole layer 340 is provided on an insulating layer 384 made of an insulating material such as $Al_2O_3$ (alumina), and acts as a magnetic path for converging and guiding a magnetic flux toward the magnetic record layer (perpendicular magnetization layer) of the magnetic disk 10, the magnetic flux being excited by write current flowing through the write coil layer 343. The main magnetic pole layer 340 has a double-layered structure in which a main magnetic pole 3400 and a main pole body 3401 are stacked sequentially and magnetically coupled with each other. The main magnetic pole 3400 is isolated by being surrounded with an insulating layer 384 formed of an insulating material such as $Al_2O_3$ (alumina). The main magnetic pole 3400 reaches the head-part end surface 2210, and includes: a main pole front end 3400a extending to the head-part end surface 2210, with a small width $W_P$ (FIG. 4c) in the track width direction; and a main pole rear end 3400b located at the rear of the main pole front end 3400a and having a width in the track width direction larger than that of the main pole front end 3400a. Here, the small width $W_P$ of the main pole front end 3400a enables a fine write magnetic field to be generated, so that the track width can be set to be a very small value adequate for higher recording density.

As shown in FIG. 4c, the main magnetic pole 340 appearing on the head-part end surface 2210 has a rectangular or square shape in the present invention, however may have a trapezoidal shape. In either case, the above-described width $P_W$ is the length of the edge on the leading side (−Z direction side) of the shape, which determines the width of track formed on the magnetic recording layer (perpendicular magnetization layer) of the magnetic disk. The width $P_W$ is, for example, in the range of approximately 0.05 to 0.5 μm.

Backing to FIG. 5, the main magnetic pole 3400 is formed of a soft-magnetic material with saturation magnetic flux density higher than that of the main pole body 3401, which is, for example, an iron alloy containing Fe as a main component, such as FeNi, FeCo, FeCoNi, FeN or FeZrN. The thickness of the main magnetic pole 3400 is, for example, in the range of approximately 0.2 to 0.5 μm. The gap layer 341 forms a gap provided for separating the main magnetic pole layer 340 from the write shield layer 345 in the region near the head-part end surface. The gap layer 341 is formed, for example, of a non-magnetic insulating material such as $Al_2O_3$ (alumina), $SiO_2$ (silicon dioxide), AlN (aluminum nitride) or DLC, or formed of a non-magnetic conductive material such as Ru (ruthenium). The thickness of the gap layer 341 determines the spacing between the main magnetic pole layer 340 and the write shield layer 345, and is, for example, in the range of approximately 0.01 to 0.5 µm.

The write coil layer 343 is formed on a insulating layer 3421 made of an insulating material such as Al₂O₃ (alumina), in such a way to pass through in one turn at least between the main magnetic pole layer 340 and the write shield layer 345, and has a spiral structure with a back contact portion 3402 as a center. The write coil layer 343 is formed of a conductive material such as Cu (copper). The write coil layer 343 is covered with a coil insulating layer 344 that is formed of an insulating material such as a heat-cured photoresist and electrically isolates the write coil layer 343 from the main magnetic pole layer 340 and the write shield layer 345. The write coil layer 343 has a monolayer structure in the present embodiment, however, may have a two or more layered structure or a helical coil shape. Further, the number of turns of the write coil layer 343 is not limited to that shown in FIG. 5, and may be, for example, in the range from two to seven.

The write shield layer 345 reaches the head-part end surface 2210, and acts as a magnetic path for the magnetic flux returning from a soft-magnetic under layer that is provided under the perpendicular magnetization layer of the magnetic disk. The thickness of the write shield layer 345 is, for example, approximately 0.5 to 5 µm. Further, the write shield layer 345 has a trailing shield 3450 that is a portion opposed to the main magnetic pole layer 340. The trailing shield 3450 also extends to the head-part end surface 2210, and is provided for receiving the magnetic flux spreading from the main magnetic pole layer 340. The trailing shield 3450, according to the present embodiment, is planarized together with an insulating layer 3420 and the main pole body 3401, and has a width in the track width direction larger than the width of the main pole rear end 3400b and the main pole body 3401 as well as the main pole front end 3400a. This trailing shield 3450 causes the magnetic field gradient between the end portion of the trailing shield 3450 and the main pole front end 3400a to be steeper. As a result, a jitter of signal output becomes smaller, and therefore, error rates during read operation can be reduced. The write shield layer 345 is formed of a soft-magnetic material; especially, the trailing shield 3450 is formed of a material with high saturation magnetic flux density such as NiFe (Permalloy) or formed of an iron alloy as the main magnetic pole 3400 is formed of.

Further, in the present embodiment, an inter-element shield layer 39 is provided between the MR element 33 and the electromagnetic transducer 34, sandwiched by the insulating layers 382 and 383. The inter-element shield layer 39 plays a role for shielding the MR element 33 from the magnetic field generated from the electromagnetic transducer 34, and may be formed of the same soft-magnetic material as the upper and lower shield layers 334 and 330. The inter-element shield layer 39 is not indispensable: the embodiment without the inter-element shield layer could be in the scope of the present invention. Further, a backing coil portion may be provided between the inter-element shield layer 39 and the waveguide 35. The backing coil portion is a coil portion for generating magnetic flux to negate a magnetic flux loop that is generated from the electromagnetic transducer 34 and passes through the upper and lower shield layers 334 and 330 of the MR element 33. Thus, the backing coil portion intends to suppress wide adjacent track erasure (WATE), that is, unwanted writing or erasing to the magnetic disk. Meanwhile, the above-described insulating layers 380, 381, 382, 383, 384 and 385 constitute the overcoat layer 38.

Alternatively, the electromagnetic transducer 34 may be designed for longitudinal magnetic recording. In this case, an upper magnetic pole layer and a lower magnetic pole layer are provided instead of the main magnetic pole layer 340 and the write shield layer 344, and further provided is a write gap layer pinched by the end portions on the head-part end surface 2210 side of the upper and lower magnetic pole layers. Write operation is performed by using leakage field generated from the pinched portion of the write gap layer. In this case, the magnetic disk 10 (FIG. 1 and FIG. 3) is also designed for longitudinal magnetic recording.

The thin-film magnetic head 21 is constituted by joining the light source unit 23 with the slider 22 including the head part 221 described above. On the joining, the joining surface 2300 of the unit substrate 230 and the back surface 2201 of the slider substrate 220 have a surface contact with each other; then, positioning (light-axis alignment) is performed so that the light-emission center 4000 on the emission surface 400 of the laser diode 40 coincides in YZ-plane with the incident center 3520 on the end surface 352 of the waveguide 35 provided in the head part 221. As a result, the laser light generated from the laser diode 40 adequately enters within the waveguide 35, and effectively reaches the near-field light generating element 36.

Figure 6:
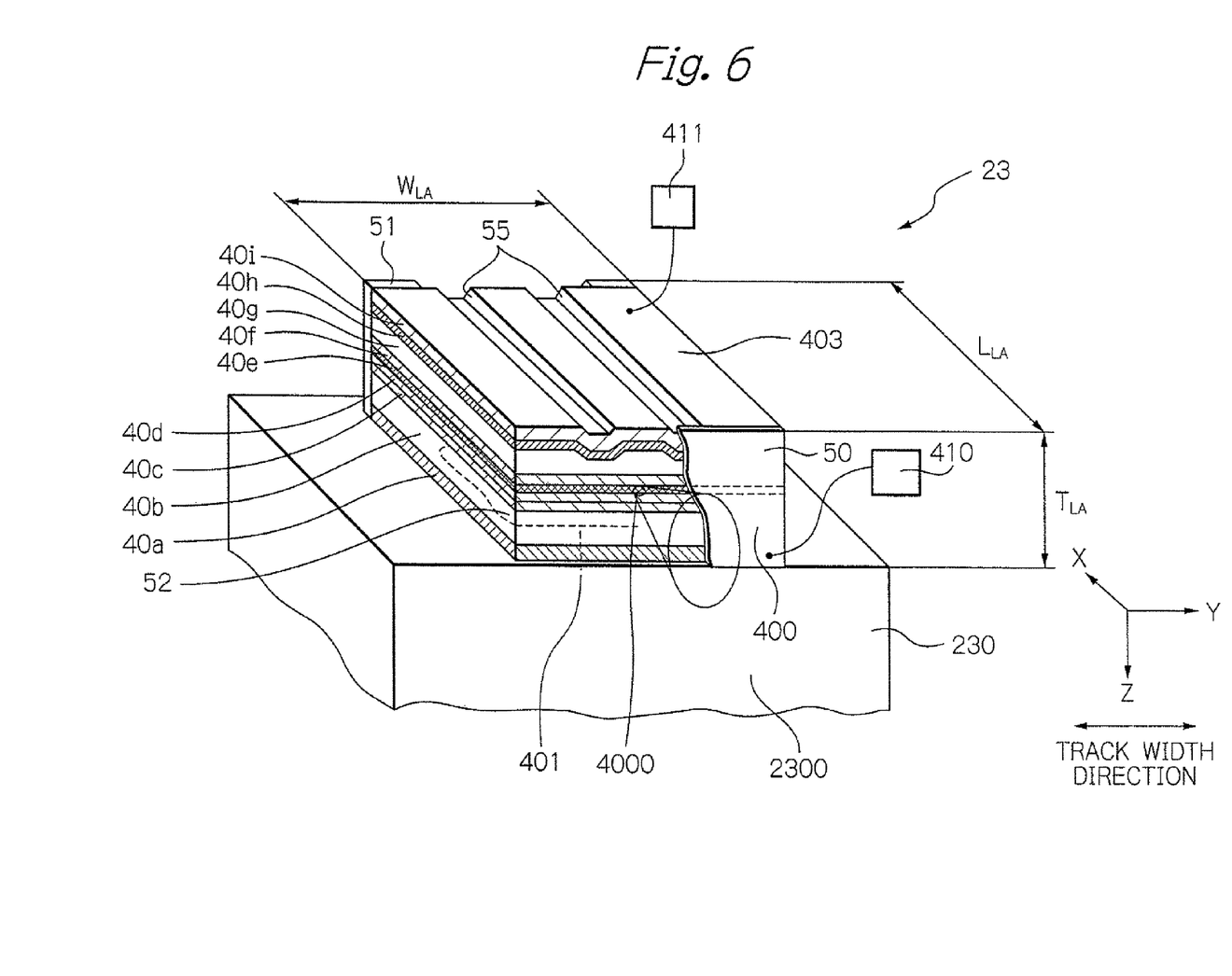
FIG. 6 shows a perspective view illustrating the structure of the laser diode and the state of joining the laser diode to the unit substrate.

FIG. 6 shows a perspective view illustrating the structure of the laser diode 40 and the state of joining the laser diode 40 to the unit substrate 230.

According to FIG. 6, the laser diode 40 has, in the present embodiment, a multilayered structure in which sequentially stacked from the unit substrate 230 side is: an n-electrode 40a; an n-GaAs substrate 40b; an n-InGaAlP clad layer 40c; the first InGaAlP guide layer 40d; an active layer 40e formed of multiquantum well (InGaP/InGaAlP) or the like; the second InGaAlP guide layer 40f; an p-InGaAlP clad layer 40g; a p-electrode base layer 40h; and a p-electrode 40i. The lower surface 401 of the laser diode 40 is equivalent to the lower surface of the n-electrode 40a. And the upper surface 403 is equivalent to the upper surface of the p-electrode 40i, and has grooves 55 extending in X-axis direction corresponding to the ridge structure of laser diode. The ridge structure is formed of concavity and convexity that exist on the p-electrode side and ranges over the clad layer, and is provided for confining and concentrating the laser light on the light-emission center. Here, the p-electrode 40i may be formed of, for example, Au with thickness of approximately 5 µm.

On the front and rear cleaved surfaces of the multilayered structure of the laser diode 40, respectively formed are reflective layers 50 and 51 made of, for example, SiO₂ or Al₂O₃ for exciting the oscillation by total reflection. The outer surface of the reflective layer 50 is the emission surface 400. Further, the reflective layer 50 has an opening (not shown in the figure) in the position of the active layer 40e including the light-emission center 4000.

The wavelength $\lambda_L$ of the radiated laser light may be, for example, in the range of approximately 400 to 650 nm. It should be noted that there is an appropriate exciting wavelength according to the constituent material of the near-field light generating element 36. For example, the wavelength $\lambda_L$ of the laser light is preferably a value close to 600 nm in the case that the near-field light generating element 36 is formed of Au.

The laser diode 40 has, for example, a width $W_{LA}$ of approximately 200 to 350 µm, a length (depth) $L_{LA}$ of 250 to 600 µm, and a thickness $T_{LA}$ of approximately 60 to 200 µm. The width $W_{LA}$ of the laser diode 40 may be decreased to approximately 100 µm. However, the $L_{LA}$ of the laser diode 40 relates to the electric current density, thus cannot be set to be a much smaller value. In first place, the laser diode 40 preferably has a certain size for facilitating the handling of the laser diode 40 during mounting.

An electric source provided within the magnetic disk drive apparatus can be used for driving the laser diode 40. In fact, the magnetic disk drive apparatus usually has an electric source with applying voltage of, for example, approximately 2V, which is sufficient for the laser oscillation. The amount of electric power consumption of the laser diode 40 is, for example, in the order of several tens mW, which can be covered sufficiently by the electric source provided within the magnetic disk drive apparatus. In practice, a predetermined voltage is applied between the terminal electrode 410 connected electrically to the p-electrode 40i and the terminal electrode 411 connected electrically to the n-electrode 40a by using the electric source, to oscillate the laser diode 40. Then, laser light radiates from the opening including the emission center 4000 of the reflective layer 50.

Also as shown in FIG. 6, the lower surface 401 that is the lower surface of the n-electrode 40a, is bonded to the source-installation surface 2302 of the unit substrate 230. This bonding can be performed by, for example, soldering with AuSn alloy 52 as a Pb-free solder. Here, the unit substrate 230 formed of, for example, AlTiC can have electric conductivity. Thus, the unit substrate 230 can acts as a ground connected to the n-electrode 40a.

The laser diode 40 and terminal electrodes 410 and 411 are not limited to the above-described embodiment. For example, the laser diode 40 may have another structure using other semiconducting materials such as GaAlAs system. Solders other than the above described can also be used for soldering the electrode of the laser diode 40. Further, the electrodes of the laser diode 40 may be isolated from the unit substrate, and then, terminal electrodes may be formed.

All the foregoing embodiments are by way of example of the present invention only and not intended to be limiting, and many widely different alternations and modifications of the present invention may be constructed without departing from the spirit and scope of the present invention. Accordingly, the present invention is limited only as defined in the following claims and equivalents thereto.

The invention claimed is:

1. A head gimbal assembly comprising: a suspension; and a heat-assisted magnetic recording head attached to said suspension and comprising a slider and a light source unit joined to said slider,
said light source unit comprising: a unit substrate; and a light source provided on a source-installation surface of said unit substrate,
said slider comprising: a slider substrate; and a head part formed on an element-integration surface perpendicular to an opposed-to-medium surface of said slider substrate, said head part comprising a write head element for writing data to a magnetic recording medium, a waveguide for guiding light being incident on an end opposite to the opposed-to-medium surface toward the opposed-to-medium surface, and at least one electrode,
an end surface opposite to the opposed-to-medium surface of said slider substrate being bonded to said suspension, said suspension comprising an opening, and said light source unit projecting through said opening to an opposite side to said slider in relation to said suspension,
a first pad being provided on an upper surface of said suspension, and a second pad provided on a lower surface of said suspension, and
an end surface opposite to the source-installation surface of said light source being connected to said first pad by a first connection member, and said at least one electrode of said head part being connected to said second pad by a second connection member.

2. The head gimbal assembly as claimed in claim 1, wherein said first pad and said second pad are opposite to each other and are positioned so as to sandwich said suspension.

3. The head gimbal assembly as claimed in claim 1, wherein at least a portion of said suspension, including a portion to which said heat-assisted magnetic recording head is attached, has a layered structure comprising a substrate and two electrically insulating layers provided so as to sandwich said substrate.

4. The head gimbal assembly as claimed in claim 3, wherein the electrically insulating layer includes polyimide resin, silicon carbide or aluminum nitride, or composite material composed of silicon carbide, aluminum nitride or metal, and polyimide resin.

5. The head gimbal assembly as claimed in claim 1, wherein said first connection member and said second connection member are made of solder.

6. A magnetic recording apparatus comprising:
a head gimbal assembly comprising: a suspension; and a heat-assisted magnetic recording head attached to said suspension and comprising a slider and a light source unit joined to said slider;
at least one magnetic recording medium; and
a control circuit for controlling read/write operations performed by said heat-assisted magnetic recording head to said at least one magnetic recording medium,
said light source unit comprising: a unit substrate; and a light source provided on a source-installation surface of said unit substrate,
said slider comprising: a slider substrate; and a head part formed on an element-integration surface perpendicular to an opposed-to-medium surface of said slider substrate, said head part comprising a write head element for writing data to a magnetic recording medium, a waveguide for guiding light being incident on an end opposite to the opposed-to-medium surface toward the opposed-to-medium surface, and at least one electrode,
an end surface opposite to the opposed-to-medium surface of said slider substrate being bonded to said suspension, said suspension comprising an opening, and said light source unit projecting through said opening to an opposite side to said slider in relation to said suspension,
a first pad being provided on an upper surface of said suspension, and a second pad provided on a lower surface of said suspension,
an end surface opposite to the source-installation surface of said light source being connected to said first pad by a first connection member, and said at least one electrode of said head part being connected to said second pad by a second connection member, and
said control circuit further comprising a circuit for controlling light-emitting operations of said light source.

7. The magnetic recording apparatus as claimed in claim 6, wherein said first pad and said second pad are opposite to each other and are positioned so as to sandwich said suspension.

8. The magnetic recording apparatus as claimed in claim 6, wherein at least a portion of said suspension, including a portion to which said heat-assisted magnetic recording head is attached, has a layered structure comprising a substrate and two electrically insulating layers provided so as to sandwich said substrate.

9. The magnetic recording apparatus as claimed in claim 8, wherein the electrically insulating layer includes polyimide resin, silicon carbide or aluminum nitride, or composite material composed of silicon carbide, aluminum nitride or metal, and polyimide resin.

10. The magnetic recording apparatus as claimed in claim 6, wherein said first connection member and said second connection member are made of solder.

* * * * *